United States Patent [19]

Wong

[11] Patent Number: 4,968,754

[45] Date of Patent: Nov. 6, 1990

[54] FUNCTIONALIZED BLOCK COPOLYMERS

[75] Inventor: Pui K. Wong, Katy, Tex.

[73] Assignee: Shell Oil Company, Houston, Tex.

[21] Appl. No.: 386,161

[22] Filed: Jul. 28, 1989

[51] Int. Cl.$^5$ ............................................. C08F 267/04
[52] U.S. Cl. .................................... 525/285; 525/296; 525/301; 525/304
[58] Field of Search ................ 525/285, 296, 301, 304

[56] References Cited

U.S. PATENT DOCUMENTS

| | | | |
|---|---|---|---|
| 4,687,815 | 8/1987 | Wong | 525/271 |
| 4,698,394 | 10/1987 | Wong | 525/316 |
| 4,708,990 | 11/1987 | Wong | 525/297 |

Primary Examiner—John C. Bleutge
Assistant Examiner—Vasu S. Jagannathan
Attorney, Agent, or Firm—Dean F. Vance

[57] ABSTRACT

Functionalized, selectively hydrogenated block copolymers are produced by reacting a maleic acid compound with a selectively hydrogenated block copolymer of monoalkenyl aromatic compound and conjugated alkadiene having within the aromatic portion monomer units containing a benzocyclobutene moiety.

7 Claims, No Drawings

FUNCTIONALIZED BLOCK COPOLYMERS

FIELD OF THE INVENTION

This invention relates to chemically modified selectively hydrogenated block copolymers of monoalkenyl aromatic compounds and conjugated alkadienes, modified in the aromatic portion by the inclusion within the polymeric chain of a monomer containing a benzocyclobutene moiety. More particularly, the invention relates to such block copolymers functionalized by the addition to the polymer of a maleic acid compound.

BACKGROUND OF THE INVENTION

Block copolymers comprising at least one block of a polymerized monoalkenyl aromatic compound, e.g., styrene, and at least one block of a polymerized conjugated alkadiene, e.g., butadiene, are well known in the art. Certain of these materials demonstrate elastomeric properties at ambient temperature but are processed by methods conventional for thermoplastic polymers at somewhat elevated temperatures. These elastomeric block copolymers are illustrated by products known as KRATON ® Thermoplastic Rubber and marketed by Shell Chemical Company. While these block copolymers find extensive utilization in a wide variety of applications, it has been found that the properties of these block copolymers are improved for other applications by hydrogenation of some or all of the carbon-carbon unsaturation in the polyalkadiene or aliphatic portion of the polymeric molecule and, on some occasions, in the poly(vinyl aromatic compound) or aromatic portion of the molecule. The selective hydrogenation of the aliphatic portion serves to provide greater resistance to oxidation and enables the polymers to be used more extensively at more elevated temperatures.

It is also advantageous on some occasions to incorporate within the polymeric molecule additional chemical moieties which permit the block copolymers to be functionalized. The functionalization of the block polymers enables a number of additional chemical processes to take place including crosslinking but also interaction with other polymeric materials. However, the potential of the non-functionalized polymer to crosslink is often a limitation on the temperature at which the polymer can be functionalized, since heating the polymer to an elevated temperature will often result in premature and undesirable crosslinking. It would be of advantage to provide a novel class of benzocyclobutene-containing selectively hydrogenated block copolymers which are further functionalized at elevated temperatures without undesirable premature crosslinking taking place.

SUMMARY OF THE INVENTION

The present invention provides a novel class of selectively hydrogenated elastomeric block polymers of monoalkenyl aromatic compound and conjugated alkadiene which incorporate within the polymer chain additional monomers which facilitate the functionalization of the polymer. The modification of the block polymer permits the functionalization of the polymer at higher temperatures without extensive crosslinking taking place. More particularly, the invention provides a novel class of such elastomeric, selectively hydrogenated block polymers incorporating normally crosslinkable monomers but which have been further modified by the addition to such crosslinkable moieties of a minor amount of a maleic acid compound.

DESCRIPTION OF THE INVENTION

The novel block polymers of the invention are produced from base polymers having at least one block of polymerized at least predominantly monoalkenyl aromatic compound and at least one block of polymerized at least predominantly conjugated alkadiene compound. Potential for functionalization of the polymer is afforded by modifying the aromatic portion of the polymer with a minor amount of an alkenyl benzocyclobutene monomer. This base polymer is selectively hydrogenated to reduce the extent of carbon-carbon unsaturation in the aliphatic portion without substantially reducing the degree of unsaturation in the aromatic portion. The selectively hydrogenated elastomeric block polymer is then reacted with a maleic acid compound to modify the reactive sites present in the pendant benzocyclobutene moieties of the aromatic portion. The resulting polymers, containing succinic acid-type moieties, crosslink by reaction, for example, with primary diamines, or interact with other polymeric materials such as polyesters or polyamides.

The selectively hydrogenated polymers from which the novel polymers of the invention are produced are known in the art, being disclosed and claimed by Wong, U.S. Pat. No. 4,687,815, incorporated herein by reference. These selectively hydrogenated, benzocyclobutene-modified polymers are produced from base block polymers having at least one block of polymerized predominantly monoalkenyl aromatic compound, herein termed an A block and at least one block of polymerized at least predominantly conjugated alkadiene, herein termed a B block.

The A block is a polymerized block of a monoalkenyl aromatic compound and a minor amount of an alkenylbenzocyclobutene. The monoalkenyl aromatic hydrocarbon usefully employed as the precursor of the A block preferably has a vinyl group, i.e., a

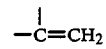

group, attached to an aromatic ring and has up to 12 carbon atoms inclusive. Preferred monoalkenyl aromatic compounds are styrene and homologs of styrene such as those represented by the formula

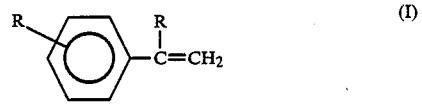

(I)

wherein R independently is hydrogen or lower alkyl of up to 4 carbon atoms inclusive, preferably hydrogen or methyl. Illustrative of such compounds are styrene, p-methylstyrene, m-ethylstyrene, alpha-methylstyrene and alpha, 4-dimethylstyrene. Styrene and alpha-methylstyrene are a preferred class of monoalkenyl aromatic compounds, especially styrene. While it is useful to include more than one monoalkenyl aromatic compound within one or more A blocks of the block polymer, it is preferred to employ block polymers wherein the A blocks are homopolymeric with regard to the monoalkenyl aromatic compound.

The alkenylbenzocyclobutene monomer which is incorporated within the A block is a monomer of the formula

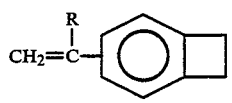 (II)

wherein R has the previously stated meaning. Illustrative alkenylbenzocyclobutene monomers include 3-vinylbenzocyclobutene, 4-vinylbenzocyclobutene, 3-isopropenylbenzocyclobutene and 4-isopropenylbenzocyclobutene. The preferred alkenylbenzocyclobutene monomers of the above formula II are those wherein R is hydrogen and particularly preferred is 4-vinylbenzocyclobutene. The precise quantity of the alkenylbenzocyclobutene monomer to be employed is not critical and amounts from about 0.01% by mole to about 20% by mole, based on total A block are satisfactory with amounts from about 0.1% by mole to about 10% by mole on the same basis being preferred. No special precautions are required to copolymerize the alkenylbenzocyclobutene within an A block of polymerized at least predominantly monoalkenyl aromatic compound. The monomers are mixed in the desired proportions and polymerized by the methods well known for the polymerization of such A blocks.

Each A block of the base block polymer independently is a minor amount of the alkenylbenzocyclobutene and predominantly the monoalkenyl aromatic compound. However, during the production of certain of the base block copolymers there is also a minor proportion of the conjugated alkadiene monomer of block B copolymerized with the monomers of block A. Such polymeric blocks are termed "tapered" and have at least 85% by mole and preferably at least 93% by mole, based on total block A of the monomers of an A block, with any remainder being the conjugated alkadiene monomer of block B. The average molecular weight of an A block is typically from about 300 to about 30,000 but A blocks of average molecular weight from about 3000 to about 20,000 are preferred.

Each B block of the base block polymer independently is a block of polymerized at least predominantly conjugated alkadiene. The alkadienes useful as the predominant monomer for a B block are conjugated alkadienes of up to 8 carbon atoms such as those represented by the formula

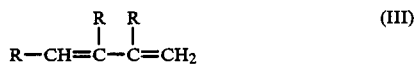 (III)

wherein R has the previously stated meaning. Illustrative of such alkadienes are 1,3-butadiene (butadiene), 2-methyl-1,3-butadiene(isoprene), 2,3-dimethylbutadiene, 1,3-pentadiene(piperylene), 1,3-octadiene and 2-methyl-1,3-hexadiene. Preferred conjugated alkadienes are butadiene and isoprene, especially butadiene. Under certain conditions it is possible to produce B blocks which are tapered. Such blocks contain at least 85% by mole, based on total B block, and preferably at least 93% by mole on the same basis of the conjugated alkadiene monomer with any remainder being substantially the monoalkenyl aromatic compound of block A.

Within a polymerized alkadiene block two modes of polymerization are possible and both are generally observed to some extent. In what is termed 1,4 polymerization, each carbon atom of the four-carbon nucleus of the alkadiene is incorporated within the polymer chain which then includes two carbon atoms connected by an ethylenic linkage. In 1,2 polymerization, the polymerization includes the carbons of only one carbon-carbon double bond of the conjugated diene in the polymeric chain which then will have a pendant vinyl group. Control of these two modes of polymerization is within the skill of the art. Preferred base block polymers are those wherein from about 25% to about 100% of the units of each B block are the result of 1,2-polymerization, preferably from about 25% to about 65% and more preferably from about 35% to about 55%. The average molecular weight of a B block is suitably from about 15,000 to about 100,000, preferably from about 25,000 to about 60,000.

Within the block polymer, an A block content of from about 2% by weight to about 55% by weight based on total polymer is satisfactory with contents of A block from about 10% by weight to about 40% by weight being preferred. The total average molecular weight of the base block copolymer will be on the order of from about 11,000 to about 2,500,000 but preferably will be from about 35,000 to about 300,000. These average molecular weights are determined by conventional methods such as gel permeation chromatography or by gel permeation-low angle light scattering.

The base block polymers are conventionally produced by anionic polymerization employing a lithium initiator by methods well known in the art. In one modification the block polymer is termed linear and is illustratively produced by sequential polymerization of the blocks. By way of example, in the production of a three block or triblock polymer, the monoalkenyl aromatic compound, together with the desired amount of alkenylbenzocyclobutene, is anionically polymerized with a lithium initiator such as sec-butyl lithium. The conjugated alkadiene is then introduced and subsequently the components required for the second A block are added. Such a three block polymer is conventionally termed an ABA polymer. A two block or diblock polymer is produced by polymerizing an A block and subsequently introducing the alkadiene required for a B block. Such a diblock polymer is termed an AB polymer. Substantially complete polymerization of each block prior to the introduction of the monomer(s) of the next block will result in blocks that are substantially homopolymeric A or B blocks. If, however, prior to the complete polymerization of any one block a monomer of the next block is introduced, a tapered block will result. Similar polymerization techniques are employed to produced polymers characterized as ABAB, ABABA or ABABABA or polymers of an even greater number of blocks. Production of block polymers, particularly those of a relatively high number of blocks or a relatively high molecular weight is also accomplished by the use of a coupling agent to join or couple growing polymer chains. Use of a difunctional coupling agent such as a dihaloalkane will result in the production of linear polymers but use of a coupling agent having a functionality of three of more, e.g., polyvinyl aromatic compounds, silicon tetrahalides or alkyl esters of dicarboxylic acids will result in the formation of polymers termed "star", "radial" or "branched" respectively. The presence of a coupling agent within the polymer chain will have little or no effect on the properties of the block polymer. In general, the preferred block polymers for ultimate conversion to the novel polymers of the invention are linear polymers of three blocks.

To produce the block polymers of limited aliphatic unsaturation the base polymers are selectively hydrogenated by a process which is sufficient to hydrogenate no more than 25% but preferably no more than 5% of the aromatic unsaturation present in the base block polymer while being sufficient to hydrogenate at least about 80% and preferably at least about 99% of the aliphatic unsaturation present within the polymer. Such hydrogenation is now conventional, being accomplished, for example, by methods disclosed in U.S. Pat. Nos. 3,113,986 and 4,226,952.

The selectively hydrogenated block polymer is often identified by the structure of the aromatic portion of the polymer and by the "apparent" structure of the aliphatic block. Thus, selective hydrogenation of a polymer which, when the alkenylbenzocyclobutene content is ignored, is a styrene-butadiene-styrene polymer (SBS), will result in a polymer having a midblock which is apparently polyethylene in the case of a midblock produced by extensive 1,4 polymerization and which is apparently ethylene/butylene copolymer in the case of a modblock produced with random proportions of 1,2 and 1,4 polymerization. These selectively hydrogenated polymers would be termed SES and SEBS respectively, and corresponding diblock polymers would be termed SE and SEB. The polymer produced by selective hydrogenation of a SIS triblock polymer of styrene and isoprene, again ignoring the alkenylbenzocyclobutene content, is termed an SEPS if the midblock resulted from extensive 1,4 polymerization because of the "apparent" similarity of the hydrogenated midblock to an ethylene/propylene copolymer. The preferred selectively hydrogenated block polymers are polymers of the SES/SEBS type. The selectively hydrogenated polymers of these types are known in the art, being disclosed in U.S. Pat. No. 4,687,815.

The structure of these selectively hydrogenated block polymers which include units with pendant benzocyclobutene groups in the aromatic portion is not easily depicted because of the complexity thereof. An illustrative depiction of the polymer having styrene (S) end blocks and a selectively hydrogenated midblock resulting from both 1,2 and 1,4 polymerization of butadiene, i.e., an EB midblock, is shown by the formula

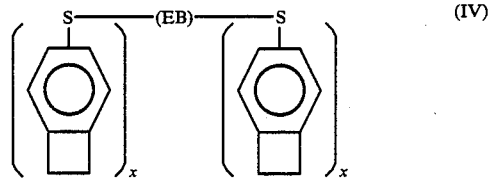

(IV)

where x independently is a relatively small, variable number. Such polymers offer the possibility of crosslinking through the pendant benzocyclobutene groups, but also for functionalization as by reaction with a maleic acid compound.

To produce the novel polymers of the invention, the benzocyclobutene-containing selectively-hydrogenated block polymers are reacted with a maleic acid compound. Without wishing to be bound by any particular theory, it appears likely that the cyclobutene ring opens during reaction with the maleic acid compound to produce an adduct, possibly of the Diels-Alder type, rather than the crosslinking which is characteristic of benzocyclobutene compounds when heated. The resulting maleic acid-modified polymer has little or no residual benzocyclobutene content but contains reactive moieties derived from the maleic acid compound, probably of a succinic acid or succinic anhydride type.

Illustrative maleic acid compounds include maleic acid, maleic anhydride, maleic acid monomethyl ester, diethyl maleate and maleic acid monoamide. The preferred maleic acid compound is maleic anhydride.

The maleic acid compound reacts with the selectively hydrogenated benzocyclobutene-containing block polymer upon the formation of an intimate mixture of the reactants and heating to an elevated temperature. The method of mixing is not material provided that an intimate, substantially uniform mixture results. In one modification, the reactants are mixed by dissolving in a mutual solvent to produce a uniform solution of the reactants, which solution is heated as such or subjected to solvent removal to afford a dry mix of the reactants. In an alternate modification, the reactants are combined in a conventional mixing device with high shear and thermal energy operating at rapid speeds. In yet another and generally preferred modification the reactants are mixed and by passing through an extruder operating in one or more stages at elevated temperature.

The relative proportions of the maleic acid compound and the block polymer reactants is not critical although it is generally desirable to provide sufficient maleic acid compound to react with substantially all of the benzocyclobutene moieties of the block polymer. The quantity of benzocyclobutene moieties present in the selectively hydrogenated, benzocyclobutene-modified block polymer is determinable by conventional analytical methods and sufficient maleic acid compound is employed to provide from about 1 mole to about 6 moles of maleic acid compound per mole of benzocyclobutene moiety, preferably from about 2 moles to about 4 moles of maleic acid compound per mole of benzocyclobutene moiety. The reactants combine when uniformly mixed and heated to an elevated temperature, preferably above about 175° C. Reaction temperatures from about 200° C. to about 275° C. are preferred. If the reaction is conducted in the melt, the modified polymers of the invention will be directly produced. Alternatively, if the reaction is conducted in solution the polymer product is recovered by conventional methods such as precipitation or solvent removal.

The resulting polymer comprises the reaction product of the maleic acid compound and the selectively hydrogenated block polymer having pendant benzocyclobutene groups in the aromatic portion. The structure of the polymers is likely quite complex and not capable of precise definition. However, the polymer products retain acidic functionality in the pendant groups. This structure permits processing at temperatures higher than those available for the benzocyclobutene-modified polymer precursor without the crosslinking exhibited by such precursors at the elevated temperatures. Yet, because of the pendant acidic functionality, likely present as succinic anhydride or succinic acid groups or esters or amides of such groups, the polymer products are crosslinkable, if desired, by reaction with compounds known to react with polyacidic materials, for example, polyamines, particularly diamines, and difunctional epoxides, but also are useful in promoting interfacial adhesion with other polymeric materials as by ammidation with a polyamide polymer or transesterification with a polyester polymer.

To further illustrate the invention the following Illustrative Embodiments are provided which should not be regarded as limiting the invention.

ILLUSTRATIVE EMBODIMENT I

For reasons of simplicity, the effect of the addition of a maleic acid compound to a selectively hydrogenated block polymer modified in the aromatic portion with pendant benzocyclobutene groups was illustrated with a benzocyclobutene-modified polystyrene.

Styrene monomer containing 1.66% by weight of 4-vinylbenzocyclobutene was anionically polymerized by conventional methods to produce a copolymer of styrene and 4-vinylbenzocyclobutene, molecular weight 59,000, which contained 0.128 milliequivalents/g of benzocyclobutene or about 7.7 pendant benzocyclobutene moieties per polymer chain. This polymer was processed in a ⅜" Brabender single screw extruder, a low intensity mixing device, without the addition of maleic anhydride (MA) and with maleic anhydride present in ratios of 1 and also 4 moles per mole of benzocyclobutene (BCB) moiety. The extrusion was conducted at a temperature of 250° C. and the residence time was 1 minute.

When the copolymer was processed without the addition of maleic anhydride, the extrudate was white and crumbly rather than the viscous fluid that would normally be expected for polystyrene. The extrudate was insoluble in tetrahydrofuran (THF) which indicated extensive crosslinking. When the samples to which maleic anhydride had been added were processed, the extrudates were clear, viscous fluids and were at least partially soluble in THF. The results are shown in the following Table.

|  | Unprocessed Copolymer | Sample 1 | Sample 2 | Sample 3 |
|---|---|---|---|---|
| Feed Ratio: | | | | |
| MA:BCB | | 0 | 1 | 4 |
| Product: | | | | |
| Physical form of extrudate | | Crumb | Fluid | Fluid |
| THF insoluble (%) | 0 | 95 | 22 | 15 |
| THF soluble (%) | 100 | 5 | 78 | 85 |
| Original copolymer remaining (% by gas phase chromatography) | | 2 | 48 | 54 |

After removal of free maleic anhydride by extraction, the soluble fractions were found to contain grafted maleic anhydride at about the expected level for complete Diels-Alder reaction. Even better results will be obtained by more efficient mixing prior to extrusion as by solvent blending or staged extrusion through multiple zones of increasing temperature.

What is claimed is:

1. A crosslinkable polymer having acidic functionality which comprises the reaction product of (A) a selectively hydrogenated block copolymer, said polymer obtained by reducing the degree of unsaturation of a base block polymer consisting essentially of at least one block of predominantly monoalkenyl compound copolymerized with an alkenylbenzocyclobutene and at least one block of polymerized at least predominantly conjugated alkadiene, and (B) a maleic acid compound.

2. The polymer of claim 1 wherein the monoalkenyl aromatic compound is styrene.

3. The polymer of claim 2 wherein the conjugated alkadiene is butadiene.

4. The polymer of claim 3 wherein the alkenyl benzocyclobutene is 4-vinylbenzocyclobutene.

5. The polymer of claim 1 wherein the maleic acid compound is maleic anhydride.

6. The polymer of claim 5 wherein the base copolymer is a triblock polymer having two blocks of predominantly styrene copolymerized with 4-vinylbenzocyclobutene and one block of polymerized at least predominantly butadiene.

7. The polymer of claim 6 wherein the selectively hydrogenated block polymer is obtained by hydrogenation of from about 80% to about 99% of the unsaturation present in the block of polymerized at least predominantly butadiene but no more than about 25% of the unsaturation present in the two blocks of predominantly styrene copolymerized with 4-vinylbenzocyclobutene.

* * * * *